J. A. DORAN.
PIN JOINT.
APPLICATION FILED JUNE 10, 1911.

1,086,656.

Patented Feb. 10, 1914.

WITNESSES

INVENTOR
James A. Doran
by Wm. H. Finckel
Attorney

UNITED STATES PATENT OFFICE.

JAMES A. DORAN, OF PROVIDENCE, RHODE ISLAND.

PIN-JOINT.

1,086,656. Specification of Letters Patent. Patented Feb. 10, 1914.

Application filed June 10, 1911. Serial No. 632,500.

*To all whom it may concern:*

Be it known that I, JAMES A. DORAN, a citizen of the United States, residing at Providence, in the county of Providence and State of Rhode Island, have invented a certain new and useful Improvement in Pin-Joints, of which the following is a full, clear, and exact description.

As is well known, the use of separate rivets applied to the pin joints of various articles of jewelry employing a pin, such as breastpins, brooches, collar pins, veil pins, and the like, is attended with disadvantages in the factory in applying the separate rivets, and in use in the loss of the rivets incident to wear. Various attempts have been made to overcome these disadvantages by supplying such pins with integral pivots.

The object of the present invention is to provide a pin joint with an integral rivet in an economical and expeditious manner.

The invention consists in a pin joint wherein the rivet is drawn up from one side of the joint, very much in the manner of drawing an eyelet, and the free end of the rivet then has the pin applied to it and its extreme end passed through a hole in the opposite side of the joint and headed up or clenched on the outside of such perforated side.

The integral drawn up rivet of the present invention may be applied to a great variety of forms of joints, as indicated herein and in the subjoined claims.

Figure 1:
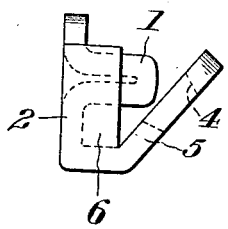
Figure 2:
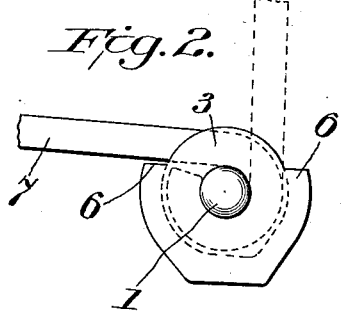
Figure 3:
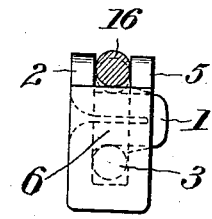
Figure 4:
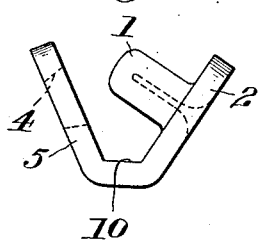
Figure 5:
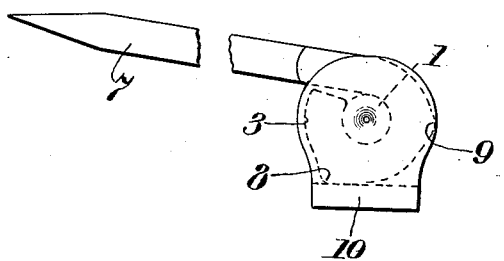
Figure 6:
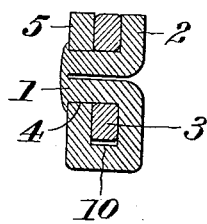
Figure 7:
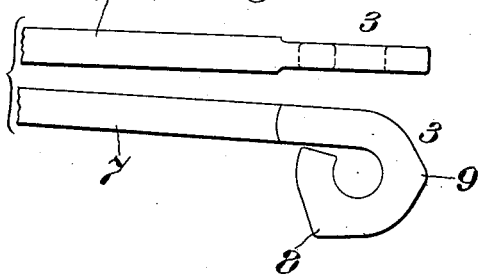

In the accompanying drawings, illustrating the invention, in the several figures of which like parts are similarly designated, Figure 1 is a front elevation; Fig. 2 is a side elevation; and Fig. 3 is a front elevation with the pin tongue in cross-section, the rivet not clenched, illustrating one embodiment of the invention. Fig. 4 is a rear elevation of another form of joint before the pin is applied; Fig. 5 is a side elevation with the pin applied and broken out; Fig. 6 is a central vertical section of the joint of Fig. 5; and Fig. 7 shows the pin of Figs. 5 and 6 in top plan view and side elevation detached.

As already sufficiently indicated, the gist of the invention resides in the rivet 1. This rivet is made integral with one side 2 of the joint, and adapted to receive the pin head 3 and then be passed through a hole 4 in the opposite side 5 of the joint and headed up clenched or upset on the outside of said perforated side, as indicated in Fig. 6, to thereby unite the sides of the joint, with the pin head mounted upon the rivet between said sides in position for use. This rivet is hollow, being drawn up from the stock of one side, much as an eyelet is formed, excepting that the point of the rivet remains closed, and in this respect the rivet differs from an eyelet, although, it is not essential that the point should be closed.

The joint shown in Figs. 1, 2 and 3, has the front and back end pieces 6, made integral with one side and turned at right angles to the sides so as to close the ends of the joint and also afford front and back stops for the pin tongue 7; the front stop being of such relative height as to develop the springiness of the pin tongue in engaging with the catch and to insure or retain such engagement against accidental release, and the back stop prevents the pin from undue recession when in open or unfastened position. This joint is designed to be soldered or otherwise cemented in place on the brooch or other article on which it is to be used; and so also are the other joints herein illustrated.

The joint shown in Figs. 4 to 7 differs from that just described in omitting the front and back stops, and to compensate for them the pin head is made with peripheral jogs or lumps 8 and 9, the former contacting with the base 10 of the joint to arrest the descent of the pin tongue and develop its springiness in engaging the catch, and the latter preventing undue recession or flopping over of the released pin. The head of the pin is shown as made with flat cheeks, parallel with the inner faces of the sides.

In all instances of my invention, the rivet is integral and hollow and drawn up from one side, and thus made very stiff, not only increasing its durability but facilitating its manufacture and insuring against loss of the pin. I am aware that prior to this invention it was proposed to supply jewelry manufacturers with pin joints having a base and sides, the sides being perforated and a pivot-pin inserted in a countersunk hole in one of the sides and swaged or upset to provide outer and inner heads or enlargements which clamp the pivot-pin in position, one of such heads being forced in the swaging operation into the countersink or recess on the inner side of the hole to securely hold the pivot-pin against any tendency to play in said hole; and thereafter the pin tongue is applied to this pivot-pin and then the free end of the pivot-pin is passed through the hole in the opposite side and headed up to unite the sides and retain the pin. Now my invention avoids the expense and labor of perforating both sides of the joint, forming a separate pivot-pin, and swaging it into place; and it also avoids defects in the pivot-pin itself and its union with the sides which ordinarily are not discovered until the joint is subjected to use. These pivot-pins are very small, almost microscopic, are difficult to handle and obviously swaged in place only by the exercise of considerable skill and with the utmost care. All these disadvantages are overcome by drawing up the pivot-pin from the material of and integrally with one of the sides. Thus by my invention not only are manufacturing economies gained, but the work of the assembler of the pin and joint is greatly facilitated, and a finished joint of great durability and simplicity is provided.

The joint herein described is capable of use or adaptation for use not only with the forms of pin heads illustrated, and herein described, but to other pin heads in common use, whether the head is made by coiling the wire of the pin upon itself, or the head is made as a block or solid transversely perforated member.

What I claim is:—

1. A pin-joint, comprising a base, a side having a perforation, and an opposite side having a rivet drawn up integrally from the metal of said side and of a size to receive and pivotally support the pin and of a length to extend across the joint and through the perforation in the perforated side, so that its free end may be headed up or clenched on the outside of such perforated side to unite the sides and retain the pin in place.

2. A pin-joint, comprising a base, a side having a perforation, and an opposite side having a rivet drawn up integrally from the metal of said side and of a size to receive and pivotally support the pin and of a length to extend across the joint and through the perforation in the perforated side, so that its free end may be headed up or clenched on the outside of such perforated side and thereby unite the sides and retain the pin in position on the rivet, combined with a pin mounted upon the rivet and confined between the sides when the rivet is headed up or clenched as described.

3. A pin-joint, comprising a base, a side having a perforation, and an opposite side having a rivet drawn up integrally from the metal of said side and of a size to receive and pivotally support the pin and of a length to extend across the joint and through the perforation in the perforated side, so that its free end may be headed up or clenched on the outside of such perforated side and thereby unite the sides, combined with a pin mounted upon the rivet and confined between the sides when the rivet is headed up or clenched as described, said pin provided with stops coöperating with the joint to develop its springiness in engaging position and to prevent its undue movement in disengaged position.

In testimony whereof I have hereunto set my hand this 25th day of May A. D. 1911.

JAMES A. DORAN.

Witnesses:
 EBER FORBES,
 JOSEPH E. MAGUIRE.

---

Copies of this patent may be obtained for five cents each, by addressing the "Commissioner of Patents, Washington, D. C."